(12) United States Patent
Sasaki

(10) Patent No.: US 6,825,908 B2
(45) Date of Patent: Nov. 30, 2004

(54) APPARATUS AND METHOD OF FORMING A SPACER FOR A LIQUID CRYSTAL PANEL

(75) Inventor: Yoshiharu Sasaki, Fujinomiya (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 36 days.

(21) Appl. No.: 10/445,901

(22) Filed: May 28, 2003

(65) Prior Publication Data

US 2004/0027529 A1 Feb. 12, 2004

(30) Foreign Application Priority Data

May 31, 2002 (JP) ........................................ 2002-158823

(51) Int. Cl.[7] .............................................. G02F 1/13
(52) U.S. Cl. ................................................... 349/156
(58) Field of Search ................................ 349/155, 156

(56) References Cited

U.S. PATENT DOCUMENTS 5,193,021 A * 3/1993 Kim ........................... 349/156

FOREIGN PATENT DOCUMENTS

| JP | 3-89320 | 4/1991 |
|---|---|---|
| JP | 5-11256 | 1/1993 |

* cited by examiner

*Primary Examiner*—James A. Dudek
(74) *Attorney, Agent, or Firm*—Young & Thompson

(57) ABSTRACT

Apparatus and method of forming a spacer for use in a liquid crystal panel are capable of economizing materials used for spacers for use in the liquid crystal panel and reducing a quantity of waste of the materials used, while being suitable for a large-scaled liquid crystal panel. A recording medium having an image forming layer is superposed on a substrate used to form a liquid crystal panel, then the recording medium is exposed through irradiation of a laser beam emitted from a recording head, and an image pattern of spacers is thereby recorded in the image forming layer. The image pattern of spacers thus recorded is then recorded on the substrate to be used as spacers for use in the liquid crystal panel by peeling off the recording medium from the substrate.

10 Claims, 11 Drawing Sheets

FIG. 4

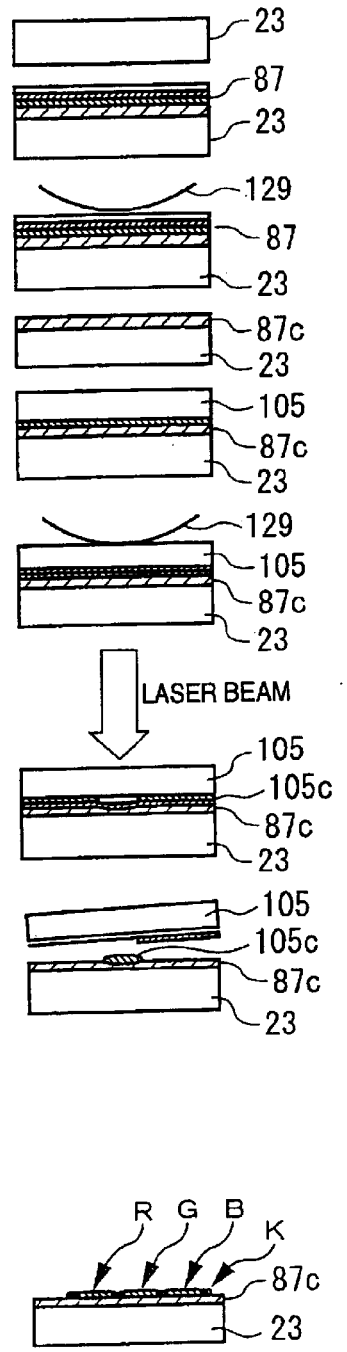

RECORDING PROCESS CHART

STEP 1: FIX MEMBER SUBJECT TO RECORDING TO STAGE

STEP 2: SUPERPOSE IMAGE-RECEIVING SHEET ON MEMBER SUBJECT TO RECORDING

STEP 3: LAMINATE IMAGE-RECEIVING SHEET (SKIPPED OPTIONALLY)

STEP 4: PEEL-OFF SUPPORTING LAYER OF IMAGE-RECEIVING SHEET
→ IAMGE-RECEIVING LAYER IS FORMED ON MEMBER SUBJECT TO RECORDING

STEP 5: DEPOSIT K (BLACK) TRANSFER SHEET

STEP 6: LAMINATE K (OPTIONALLY)

STEP 7: RECORD DATA FOR K WITH LASER BEAM

STEP 8: PEEL-OFF K
→ PART OF IMAGE FORMING LAYER OF K IS TRANSFERRED ONTO IMAGE-RECEIVING LAYER

STEP 9: DEPOSIT R (RED) TRANSFER SHEET IN CLOSE ADHESION

STEP 10: LAMINATE R (OPTIONALLY)

STEP 11: RECORD DATA FOR R WITH LASER BEAM

STEP 12: PEEL-OFF R

STEP 13: DEPOSIT G (GREEN) TRANSFER SHEET IN CLOSE ADHESION

STEP 14: LAMINATE G (OPTIONALLY)

STEP 15: RECORD DATA FOR G WITH LASER BEAM

STEP 16: PEEL-OFF G

STEP 17: DEPOSIT B (BLUE) TRANSFER SHEET IN CLOSE ADHESION

STEP 18: LAMINATE B (OPTIONALLY)

STEP 19: RECORD DATA FOR B WITH LASER BEAM

STEP 20: PEEL-OFF B

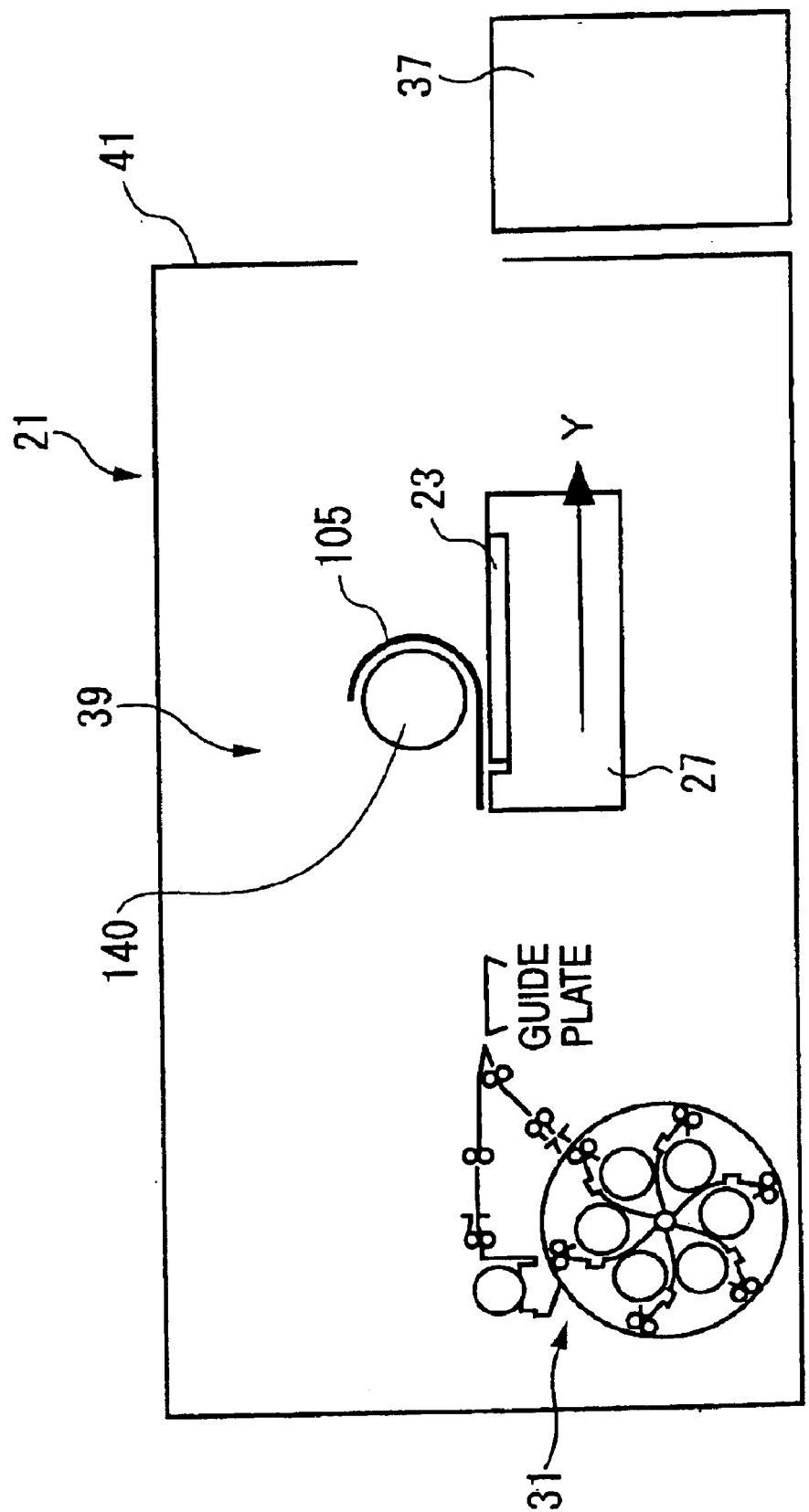

APPARATUS AND METHOD OF FORMING A SPACER FOR A LIQUID CRYSTAL PANEL

BACKGROUND OF THE INVENTION

1. Field of the Invention

The present invention relates to apparatus and method of forming a spacer for use in a liquid crystal panel, wherein the spacer is disposed between two substrates that together form the liquid crystal panel and thereby secures a spacing between the substrates.

2. Description of the Related Art

FIG. 13 is a view showing a structure of a liquid crystal panel employed in a display device of a computer or the like.

The liquid crystal panel 201 is formed by placing a lower substrate 203 and an upper substrate 205 to oppose each other, and sealing a liquid crystal material 207 in a space between the substrates 203 and 205.

The lower substrate 203 has a glass substrate 203a, on one surface of which is formed a circuit layer 203b including pixel electrodes, thin film transistors (TFTs), MIM forming elements, matrix wiring, etc., and on the other surface of which is formed a phase difference plate 203c, with the circuit layer 203b being faced toward the upper substrate 205.

The upper substrate 205 has a glass substrate 205a, on one surface of which are formed electrodes, a color filter 205b, etc., and on the other surface of which is formed a phase difference plate 205c, with the color filter 205b being faced toward the lower substrate 203.

The substrates 203 and 205 are placed to oppose each other with spacers 209 being sandwiched in between, and thereby secure a spacing between the substrates 203 and 205, into which the liquid crystal material 207 is sealed.

The liquid crystal material 207 is sealed in a space between the substrates 203 and 205 as the periphery thereof is hermetically sealed with a seal 211.

A polarizing plate 213 is further deposited on the main surface side of the upper substrate 205.

Also, a polarizing plate 215, an optical film 217 used to improve a light utilization factor, an optical film 219 functioning as a prism or a lens, and a diffusing plate 221 are sequentially deposited on the back surface side of the lower substrate 203, and an optical waveguide 223 and a reflecting plate 225 are further deposited on the outside.

In addition, a lamp 227 is placed in close proximity to the optical waveguide 223 so that light is projected onto the optical waveguide 223.

Incidentally, while the display performance, such as resolution, is being upgraded, a cost reduction of the liquid crystal panel has been pursued by reducing the number of components used, improving the manufacturing method, etc.

For example, in the case of the conventional liquid crystal panel 201, transparent, cylindrical or granular beads are used as the spacers 209, and a spacing between the substrates is secured by scattering the beads across the surface of either substrate (or occasionally the both substrates) before the upper and lower substrates 205 and 203 are coupled to each other, so that the beads are sandwiched by a pair of the substrates 203 and 205.

According to this method, however, only a small number of spacers 209, which are the beads scattered over protrusions (the pixel electrodes, TFTs, MIM forming elements, matrix wiring, etc, forming the circuit layer 203b) on the lower substrate 203, are brought into contact with the upper substrate 205. This causes a load to be concentrated on the contact portions of a small number of spacers 209, which may possibly damage the elements and electrodes.

A countermeasure to avoid concentration of a load on part of the spacers 209 could have been taken by increasing a scattering density of the spacers 209. However, such a countermeasure scatters a number of spacers 209 on the display portion as well, and raises a new problem that the contrast is deteriorated.

In order to eliminate the foregoing problems, a technique, disclosed in JP-A-3-89320, has been proposed.

According to this technique, spacers are formed by applying a resin material on the surface of a lower substrate 8 composed of, as shown in FIG. 14A, a glass substrate 1 on the surface of which gate electrodes 2, an insulation film 5, drain electrodes 6, a passivation film 7, etc. are formed sequentially from bottom to top.

A more concrete procedure is as follows. That is, as shown in FIG. 14B, UV cure resin 9 is applied first across the entire surface of the lower substrate 8 in a predetermined thickness, then UV rays are irradiated to the resin 9 at portions that are not positioned above the pixel electrodes, and resin 9a on the irradiated portions is thereby cured, after which resin 9b on an uncured portion is removed. The resin 9a left in the form of pillars as shown in FIG. 14C is thus obtained as spacers.

According to this method, because the spacers are positioned on the outside of the portions above the pixel electrodes, even when the number of spacers are increased, neither the elements nor the electrodes will be damaged by a load acting on the spacers, and deterioration of the contract can be prevented. It is thus possible to obtain a liquid crystal panel with a high display performance.

This method, however, takes a long time in the coating process and the drying process for resin to be made into spacers. Also, another process is generally needed to provide a protection layer on the surface of the applied UV cure resin 9 in preventing deterioration of writing reproducibility resulted from oxygen-induced desentization during the exposure with UV rays, which raises a problem that the productivity becomes poor.

Further, in a case where spacers are formed on the substrate including a black stripe that forms a color filter, there is a possibility that the alignment layer in contact with the UV cure resin is dissolved in a solvent contained in the resin.

In order to eliminate the foregoing problems, a method of forming a spacer for use in a liquid crystal panel, disclosed in JP-A-5-11256, has been proposed.

According to this method of forming a spacer for use in a liquid crystal panel, a photosensitive sheet subjected to development processing is used. The photosensitive sheet is formed by depositing an organic polymer layer used to block oxygen during exposure and a light-cure resin layer that can be developed in a water-based developer on a sheet-like flexible supporting body.

The procedure of forming a spacer is as follows.

Firstly, the oxygen-blocking organic polymer layer and the light-cure resin layer used for development provided on the photosensitive sheet are transferred onto at least one of two substrates that together form a liquid crystal panel.

Then, the light-cure resin layer transferred onto the substrate is subjected to pattern exposure at positions that do not overlap the pixel electrodes on the substrate or at local positions corresponding to the portion above the black stripe forming the color filter. Cured portions that will be used as the spacers are thus obtained.

Subsequently, an unexposed portion on the substrate is removed through development processing, and as a consequence, only the portions of the light-cure resin layer cured through exposure are left on the substrate as the spacers.

According to this method of forming a spacer for use in a liquid crystal panel, as shown in FIG. 15 for example, in a pixel array on the surface 13 of the substrate used to form the liquid crystal panel, it is possible to form spacers 14 for the sets of pixel electrodes 11r, 11g, and 11b respectively provided with RGB color filters on a one-to-one basis exactly in a narrow region 15 between pixels 11 or at a position on the black stripe. Consequently, concentration of a load on the spacers can be reduced. Also, because exposure is performed while the surface of the substrate is covered with the oxygen-blocking organic polymer layer, oxygen-induced desentization will not occur, which makes it possible to prevent deterioration of writing reproducibility. Further, even in a case where spacers are formed on the substrate having the black stripe, a possibility that the alignment film is dissolved in a solvent contained in the resin layer is eliminated. Moreover, because neither the coating process nor the drying process that takes a long time is needed, the productivity can be improved.

According to the method of forming a spacer for use in a liquid crystal panel in the publication supra, however, after the photosensitive sheet is transferred onto the entire surface of the substrate used to form the liquid crystal panel, an unexposed portion that accounts for greater part thereof (approximately 99.82% in the case of the array of spacers shown in FIG. 15) is removed and discarded through the development processing, which raises a problem that the materials are used wastefully.

Also, there is another problem that high-cost treatment of waste liquid, such as a developer, makes it difficult to reduce the manufacturing cost of the liquid crystal panel.

Further, a highly accurate mask is needed to expose the light-cure resin layer only at the portions that will be used as the spacers, and the manufacturing cost of the mask increases with an increase of the size of the substrate. This raises still another problem that this method is not suitable to a large-scaled liquid crystal panel.

SUMMARY OF THE INVENTION

The invention has an object to provide apparatus and method of forming a spacer for use in a liquid crystal panel, capable of economizing materials used for spacers and reducing a quantity of waste of the materials used or the like while making it possible to reduce concentration of a load on the spacers, prevent deterioration of writing reproducibility, prevent dissolution of the alignment film, improve the productivity, etc.

The invention provides a method of forming a spacer for a liquid crystal panel, said spacer being disposed between two substrates that together form the liquid crystal panel to secure a spacing between said substrates, including steps of superposing a transfer sheet on a surface of one of said two substrates; recording a desired image pattern onto said transfer sheet by image recording process through the use of one of a laser beam and heat; and peeling off said transfer sheet to form said image pattern transferred onto said substrate.

In the method of forming a spacer of the invention, in a case where a color filter having a black stripe is placed on said substrate on which said image pattern is to be formed, a transfer position of said image pattern may be set on said black stripe.

In the method of forming a spacer of the invention, a maximum width of said image pattern to be transferred onto said black stripe may be set two or less times greater than a width of said black stripe.

According to the method of forming a spacer, an image recording method for transferring an image pattern recorded in a transfer sheet onto the substrate by using a laser beam or heat is applied to form a spacer. Therefore, it is possible to form a number of spacers, for example, in a narrow portion between pixels, by high-precision process at high accuracy that can be achieved by an image recording technique. Hence, because a load can be dispersed to a number of spacers, concentration of a load on the spacers can be reduced. It is thus possible to prevent damages to the elements and the circuits on the substrate caused by an excess load.

Also, the forming position of the spacers can be limited to a portion where the presence of the spacers do not adversely effect the display performance, for example, a portion between adjacent pixels on the substrate used to form the liquid crystal panel or a portion on the black stripe. It is thus possible to prevent the occurrence of inconveniences, such as deterioration of contrast and deterioration of writing reproducibility.

In the method of forming a spacer of the invention, said transfer sheet is reused until a remaining non-recorded portion, where said image pattern is not recorded, reaches a specified level or below by repetitively performing steps of superposing said transfer sheet on said substrate at a position shifted from a position exposed last, so that the non-recorded portion undergoes the image recording process next; performing the image recording process; and peeling off said transfer sheet from said substrate side.

Therefore, it is possible to prevent such an event that the transfer sheet used as a recording medium is discarded with a large quantity of an unexposed portion left thereon. Hence, the materials used for spacers can be economized and a quantity of waste of the materials used or the like can reduced, thereby making it possible to achieve environmental protection through effective utilization of resources and a reduction of waste.

In the method of forming a spacer of the invention, said image pattern is repetitively transferred onto a same point on said substrate used to form the liquid crystal panel, so that a spacer of a desired height is formed.

Therefore, a height of the spacer can be readily changed.

In the method of forming a spacer of the invention, said image pattern to be transferred is reduced gradually in size each time transferring is performed when said spacer of the desired height is formed.

Thus, a contact area between the tip end and the opposing substrate becomes so small that even when the spacer is transferred and formed at a slightly shifted position, the tip end will not go outside of the position where it is supposed to come into contact with the opposing substrate. This makes it possible to ensure a spacing between the substrates in a more secure manner.

The invention provides an apparatus for forming a spacer for use in a liquid crystal panel, said spacer being disposed between two substrates that together form the liquid crystal panel to secure a spacing between said substrates, has a stage for supporting at least one of said two substrates; a recording medium supply portion for supplying a recording medium onto said substrate placed on said stage; a recording head for forming a desired image pattern onto said recording medium placed in piles through the use of one of a laser beam and heat; recording medium peel-off means for peeling off said recording medium from said substrate; and recording medium reattachment means for returning said recording medium onto said substrate by shifting a position of said recording medium to set a non-recorded portion remaining on said recording medium peeled off by said recording medium peel-off means as a next recoding portion of said image pattern.

According to the apparatus for forming a spacer, a method of forming a spacer for use in a liquid crystal panel is achieved through image recording process, and the concrete arrangement of the apparatus is the same as that of an existing recording apparatus that forms an image, such as a color filter, on the substrate. Hence, by developing the existing recording apparatus, the manufacturing cost can be reduced by minimizing the need for extra special facility on one hand, and improving the operating rate of the existing facility on the other hand.

In the apparatus for forming a spacer of the invention, the apparatus further has temporary storing means for temporarily storing said recording medium peeled off by said recording medium peel-off means.

According to the apparatus for forming a spacer, for example, by forming the temporary storing means with a capability of accommodating plural kinds of recording media separately, the apparatus can be used to form a spacer by selectively using plural kinds of recording media.

Also, by incorporating a mechanism that shifts the positioning reference position on the recording medium when the recording medium is returned onto the substrate into the temporary storing means provided at the fixed position, positioning control in positioning a non-recorded portion of the recording medium with respect to the spacer forming portion on the substrate can be performed more readily.

Also, the apparatus of forming a spacer for use in a liquid crystal panel as described above can be readily achieved by adding temporary storing means to the recording medium supply portion in an existing recording apparatus that forms an image, such as a color filter, on the substrate used to form the liquid crystal panel, and therefore, the capital investment can be reduced.

In the apparatus for forming a spacer of the invention, said recording head switches wavelength of laser beam from which is output in associated with a recoding medium used to form a color filter and a recording medium used to form a spacer each having a different recording wavelength.

Thus, because the recording head can switch the output wavelengths, an existing recording apparatus that forms an image, such as a color filter, can be used.

In the apparatus for forming a spacer of the invention, said recording head has first recording head that outputs first laser beam in associated with a recoding medium used to form a color filter and a second recording head that outputs second laser beam in associated with a recording medium used to form a spacer, wavelengths of the first laser beam and the second laser beam are respectively different.

Thus, because two recording heads that output different wavelengths are provided, an existing recording apparatus that forms an image, such as a color filter, can be used.

BRIEF DESCRIPTION OF THE DRAWINGS

FIG. 4 is an explanatory view conceptually showing a recording process with respect to the recording medium shown in FIG. 2;

FIG. 7 is a longitudinal cross section showing an operation of the recording apparatus shown in FIG. 3 when the recording medium is peeled off;

BRIEF DESCRIPTION OF THE PREFERRED EMBODIMENTS

The following description will describe preferred embodiments of an apparatus for forming a spacer for use in a liquid crystal panel according to the invention with reference to the accompanying drawings in detail.

Figure 1:
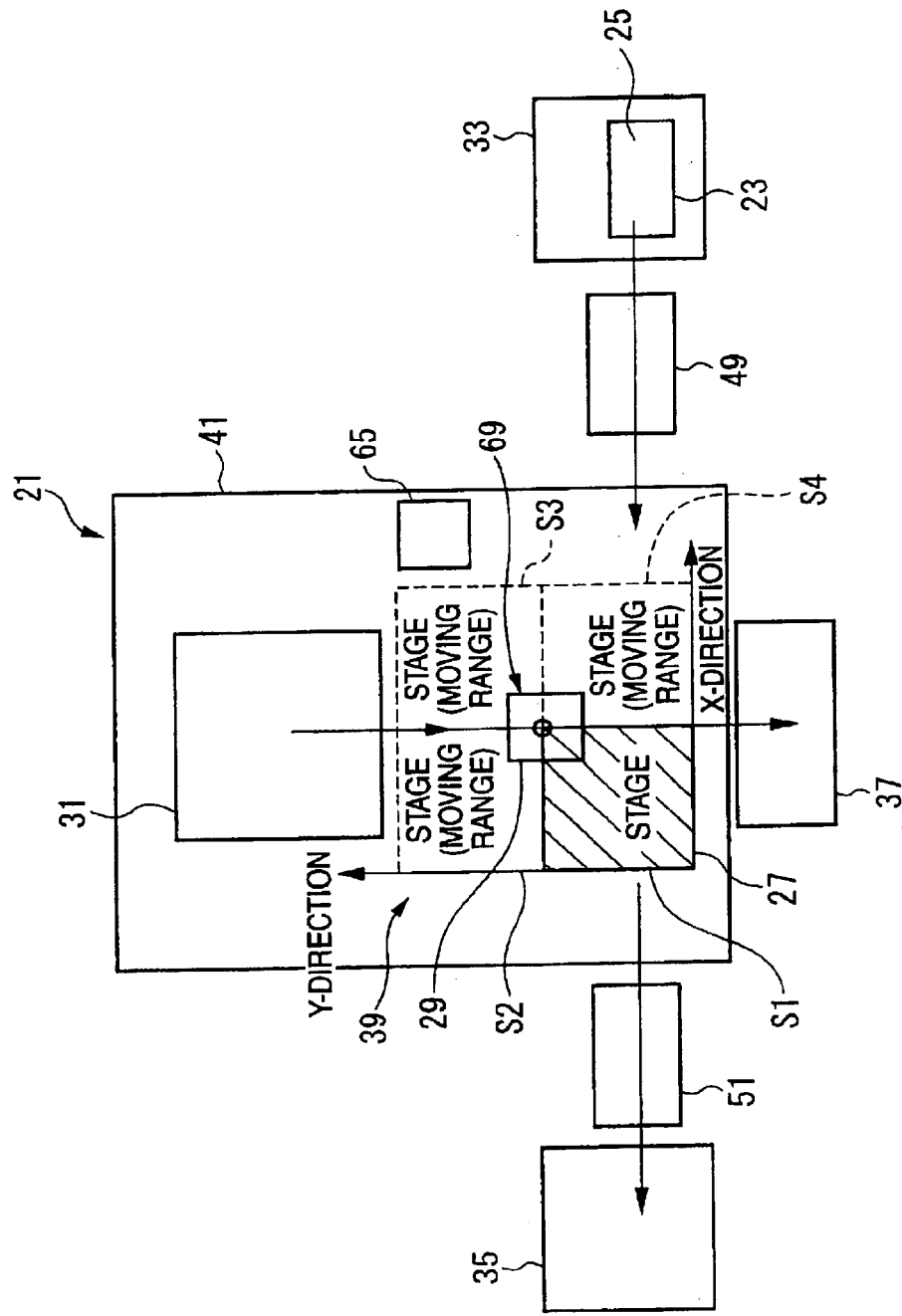
FIG. 1 is a block diagram schematically showing an arrangement of a recording apparatus according to the invention that is used to form spacers.

FIG. 1 is a view showing one embodiment of a recoding apparatus used as a spacer forming apparatus according to the invention.

The spacer forming apparatus 21 is a partly modified existing image recording apparatus for recording information, such as images, characters and patterns, on the surface of a plate-like member to be recorded, such as a glass substrate, a slate, a metal plate and a ceramic plate, through a transfer sheet including a light-to-heat converting layer and an image forming layer. Selecting a substrate used to form the liquid crystal panel as the member to be recorded enables the use in a case where an image, such as a color filter, is formed on a substrate.

The recording apparatus 21 includes, as the basic arrangement, a recording portion 39 provided with a stage 27 that holds a plate-like member to be recorded 23 through suction and a recording head 29 from which a writing laser beam is emitted, a sheet-like recording medium 5 (an image-receiving sheet 87 or a transfer sheet 105) on which an image or the like described below is recorded as being exposed through spot irradiation of a writing laser beam emitted from the recording head 29, a recording medium supply portion 31 for supplying the recording medium 87, 105 so as to be deposited on a recording surface 25 of the member to be recorded 23 held on the stage 27, a pressure roller for pressing and thereby bringing the recording medium 87/105 deposited on the recording surface 25 of the member to be recorded 23 into close adhesion to the recording surface 25 of the member to be recorded 23 in transferring a recorded image on the recording medium onto the member to be recorded 23, and peel-off means (a peel-off roller, peel-off grooves, peel-off claws) for peeling off the recording medium, from which the recorded image has been transferred, from the member to be recorded 23. The pressure roller and the peel-off means will be described below.

The stage 27 is supported by an unillustrated moving guide mechanism in such a manner that it is allowed to move in the X-direction and the Y-direction along the surface (plane surface) of the recording medium 5 on the member to be recorded 23.

Although it is not illustrated, the moving guide mechanism is, to be more concrete, formed by combining a first slide base supported by a first guide rail extending in the X-direction and thereby being allowed to move in the X-direction, and a second slide base supported by a second guide rail extending in the Y-direction and thereby being allowed to move in the Y-direction.

A moving range of the stage 27 allowed by the aforementioned moving guide mechanism includes a first quadrant S1, a second quadrant S2, a third quadrant S3, and a fourth quadrant S4 around a recording original point position 69, the area of each being equal to the area of the stage 27. That is, the stage 27 is allowed to move by a distance twice the size in length and width in the X-direction and the Y-direction. The X-direction and the Y-direction are respectively the main scanning direction and the sub-scanning direction of a writing laser beam, which allows the recording head 29 positioned at the recording original point position 69 to scan relatively with respect to the stage 27 at all the positions.

The recording head 29 is set movably either at a stand-by position 65 or the recording original point position 69, so that it is retracted to the stand-by position 65 when the member to be recorded 23 or the recording medium is carried in or carried out from the stage 27, and returned to the recording original point position 69 when an image is recorded through irradiation of a writing laser beam to the recording medium on the member to be recorded 23.

Further, in addition to the basic arrangement described above, the recording apparatus 21 includes a member-to-be-recorded supply portion 33 in which members 23 subject to recording are stored in piles, a carry-in mechanism 49 for transporting a member to be recorded 23 to the stage 27 from the member-to-be-recorded supply portion 33, a discharge mechanism 51 for discharging the member to be recorded 23, on which the image has been transferred, from the stage 27, and a member-to-be-recorded reception portion 35 in which members 23 subject to recording discharged by the discharge mechanism 51 are placed and stored in piles. Numeral 37 in FIG. 1 denotes a trash box into which a used recording medium is discarded.

In addition, in terms of safety such as prevention of leakage of a laser beam, the recording apparatus 21 is arranged in such a manner that a shielding frame 41 covers the peripheries of the recording portion 39 and the recording medium supply portion 31. The shielding frame 41 is provided with an openable and closable passing opening portion through which a member to be recorded 23 is carried in or discharged, and a passing opening portion through which a used recording medium is discharged.

Figure 2:
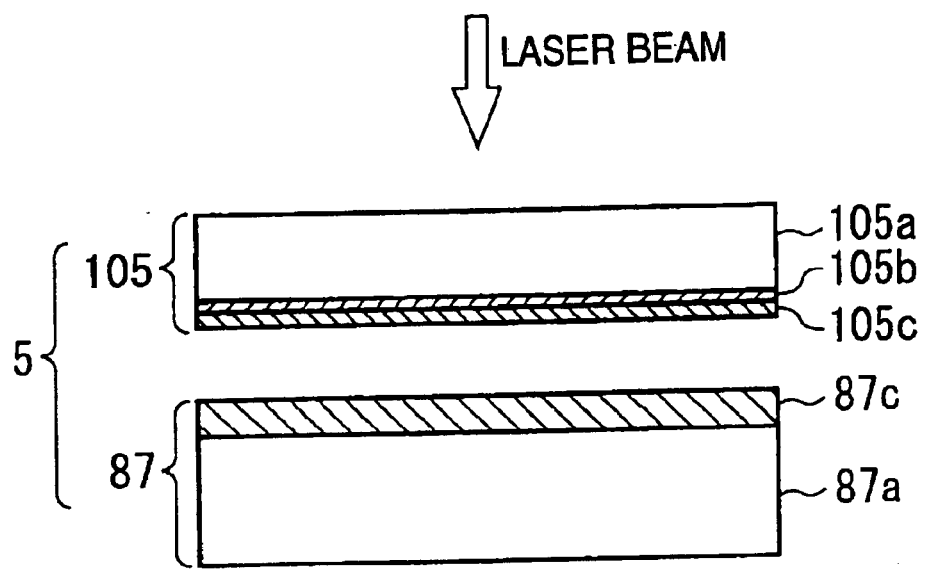
FIG. 2 is a cross section of a recording medium composed of an image-receiving sheet and a transfer sheet used in the recording apparatus of FIG. 1.

As shown in FIG. 2, the recording medium 5 is composed of the image-receiving sheet 87 and the transfer sheet 105 deposited on the image-receiving sheet 87.

The image-receiving sheet 87 is composed of a supporting layer 87a and an image-receiving layer 87c, which are generally deposited vertically in this order.

A PET (polyethylene terephthalate) base, a TAC (triacetylcellulose) base, a PEN (polyethylene naphthalate) base, etc. can be used for the supporting layer 87a. The image-receiving layer 87c has a function of receiving toner being transferred.

As shown in FIG. 2, the transfer sheet 105 is composed of a supporting layer 105a, a light-to-heat converting layer 105b and an image forming layer (toner layer) 105c, which are deposited vertically in this order. The supporting layer 105a can be arbitrarily selected from typical supporting body materials (for example, supporting body materials same as those specified above as the materials for the supporting layer 87a of the image-receiving sheet 87) as long as it is a material capable of transmitting a laser beam.

The light-to-heat converting layer 105b has a function of converting laser energy to heat. The light-to-heat converting layer 105b can be arbitrarily selected from typical light-to-heat converting materials, including carbon, a black material, an infra-red absorbing dye, a specific wavelength absorbing material, etc. as long as it is a material capable of converting light energy to heat energy. The color of the toner layer 105c can be, for example, black (K), red (R), green (G), and blue (B) as well as cyan (C), magenta (M), and yellow (Y) for use in printing, or alternatively gold, silver, orange, gray, pink, etc. called special colors.

Figure 3:
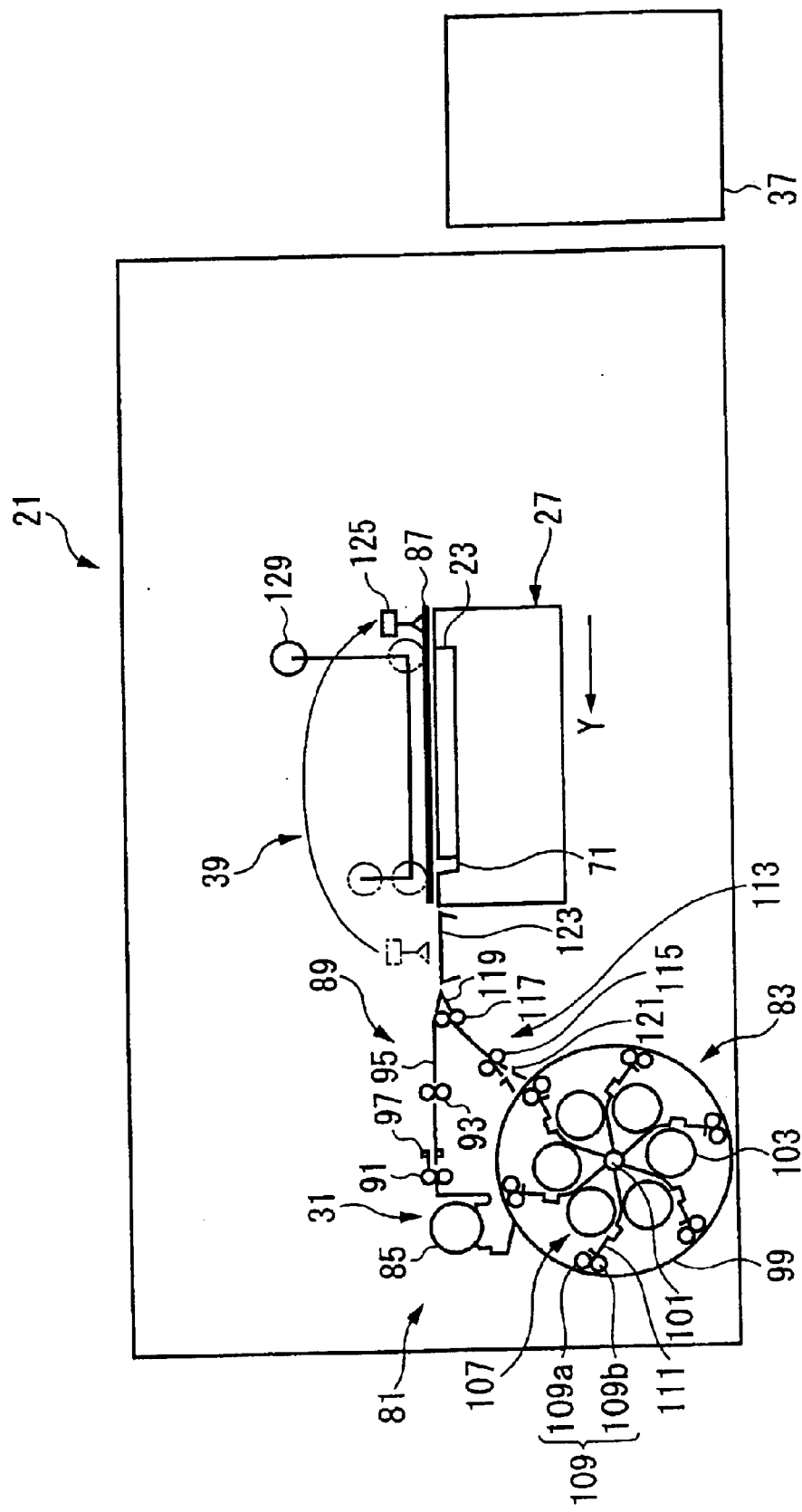
FIG. 3 is a view depicting an arrangement of a major portion by showing a recording medium supply portion and a recording portion.

As shown in FIG. 3, the recording medium supply portion 31 includes an image-receiving sheet supply portion 81 and a transfer sheet supply portion 83. The image-receiving sheet supply portion 81 supplies the recording portion 39 with the image-receiving sheet 87. Also, the transfer sheet supply portion 83 enables a supply of plural kinds of transfer sheets 105, and therefore can supply the recording portion 39 selectively with one kind of transfer sheet 105 among plural kinds of transfer sheets 105.

The image-receiving sheet supply portion 81 includes an image-receiving sheet roll 85. The image-receiving sheet roll 85 is a roll of the image-receiving sheet 87 wound around its core. As shown in FIG. 2, the image-receiving sheet 87 is composed of the supporting layer 87a and the image-receiving layer 87c deposited vertically in this order.

The image-receiving sheet supply portion 81 further includes an image-receiving sheet transportation portion 89. The image-receiving sheet transportation portion 89 includes an unillustrated motor, an unillustrated driving transmission belt or chain, transportation rollers 91 and 93, a supporting guide 95, an image-receiving sheet cutting portion 97, and an unillustrated detection sensor that detects the rear end of the image-receiving sheet 87.

Each of the transportation roller 91 and the transportation roller 93 includes a pair of rollers. The driving mechanism arranged in this manner makes it possible to send the image-receiving sheet 87 to the recording portion 39 or return the same from the recording portion 39.

The image-receiving sheet 87 is pulled out from the image-receiving sheet roll 85 by the aforementioned driving mechanism, such as the motor, with the top end thereof being pinched by the transportation roller 91. This causes the image-receiving sheet roll 85 to start rotating, and the image-receiving sheet 87 is thereby unreeled. The image-receiving sheet 87 is further pinched by the transportation roller 93 and guided by the supporting guide 95, and transported forward.

The image-receiving sheet 87 transported by the image-receiving sheet transportation portion 89 is cut into a predetermined length by the image-receiving sheet cutting portion 97. A detection sensor, such as a photo-sensor, is used to measure the length. In other words, the length can be measured by detecting the top end of the image-receiving sheet 87 through the use of the detection sensor, and by taking into account the rotational speed of the motor or the like. The image-receiving sheet 87 is cut into a predetermined length based on the measuring result, and is supplied to the recording portion 39. The image-receiving sheet cutting portion 97 includes a supporting portion and a guide in addition to a cutter, all being unillustrated. The image-receiving sheet 87 unreeled from the image-receiving sheet roll 85 by the driving described above is cut into a predetermined length by the cutter after its transportation is stopped based on the measuring result of an image-receiving sheet length described above.

As is described, the image-receiving sheet supply portion 81 supplies the recording portion 39 with the image-receiving sheet 87 of a predetermined length by unreeling and cutting part of the image-receiving sheet roll 85.

On the other hand, the transfer sheet supply portion 83 includes a rotary rack 99. As is described below, the rotary rack 99 is rotated about the rotational shaft 101. Also, a plurality of (six in the drawing) transfer sheet rolls 103 are accommodated in the rotary rack 99, and are placed radially about the rotational shaft 101.

Each transfer sheet roll 103 includes a core, the transfer sheet 105 wound around the core, and unillustrated flanges inserted from the both sides of the core. Each transfer sheet roll 103 is held rotatablly about its core. The outside diameter of the flanges is made greater than the diameter of the transfer sheet portion, so that the transfer sheet portion will not come undone.

In regard to the transfer sheet roll 103, the transfer sheet 105 is wound around the core in such a manner that the toner layer 105c comes outside with respect to the supporting layer 105a. As is described below, the toner layer 105c includes toner ink, which is transferred onto the image-receiving sheet 87 through exposure with a laser beam.

This embodiment shows a case where six transfer sheet rolls 103 are accommodated in the rotary rack 99. The six kinds of transfer sheets include, for example, transfer sheets of the aforementioned four colors including black, red, green and blue.

The rotary rack 99 further includes a transfer sheet unreel mechanism 107 for each of the plurality of transfer sheet rolls 103. The transfer sheet unreel mechanism 107 is composed of a feed roller 109 and a supporting guide 111.

The feed roller 109 includes rollers 109a and 109b. The roller 109a is connected to a motor through an unillustrated gear mechanism, and is thereby driven by the motor. Also, the roller 109a together with the other roller 109b can sandwich the transfer sheet 105 with a predetermined pressure. The other roller 109b counter-rotates against the roller 109a, and thereby transports the transfer sheet 105. The transfer sheet 105 is pinched by the rollers 109a and 109b, and can be sent forward or backward. Meanwhile, the transfer sheet roll 103 rotates in association with the transportation of the transfer sheet 105.

The transfer sheet 105 is supplied to the recording portion 39 by the transfer sheet unreel mechanism 107 having such a structure. The feed roller 109 is driven by the aforementioned driving mechanism, such as the motor, while the top end of the transfer sheet 105 is pinched by the feed roller 109. The transfer sheet 105 is thereby unreeled through this driving.

The transfer sheet 105 is further cut into a predetermined length in a transfer sheet transportation portion 113 described below, and then supplied to the recording portion 39.

As is described, the rotary rack 99 accommodating plural kinds of transfer sheet rolls 103 can selectively supply the transfer sheet transportation portion 113 with a desired kind of transfer sheet 105.

The transfer sheet transportation portion 113 includes an unillustrated motor, an unillustrated driving transmission belt or chain, transportation rollers 115 and 117, a guide 119, a transfer sheet cutting portion 121, and an unillustrated detection sensor that detects the end of the transfer sheet 105. Each of the transportation rollers 115 and 117 includes a pair of rollers. The rollers 115 and 117 are connected to the motor through the driving transmission belt or chain, and are thereby driven by the motor and transport the transfer sheet 105.

The driving mechanism (recording medium reattachment mechanism) arranged in this manner makes it possible to send the transfer sheet 105 forward to or backward from the recording portion 39. The transfer sheet 105 transported in this manner is cut into a predetermined length by the transfer sheet cutting portion 121.

A detection sensor, such as a photo-sensor, is used to measure the length of the transfer sheet 105. In other words, the length can be measured by detecting the end of the transfer sheet 105 through the use of the detection sensor, and by taking into account the rotational speed of the motor or the like. The transfer sheet 105 is cut into a predetermined length based on the measuring result, and is supplied to the recording portion 39. Although it is not shown in the drawing, the transfer sheet cutting portion 121 includes a supporting portion, a guide, etc. in addition to a cutter.

As is described, the transfer sheet supply portion 83 supplies the recording portion 39 with the transfer sheet 105 of a predetermined length by unreeling and cutting part of the transfer sheet roll 103.

When the transfer sheet 105 is unreeled and consumed, the used transfer sheet roll 103 needs to be removed and replaced with a new transfer sheet 105.

The transfer sheet roll 103 can be replaced by opening an unillustrated lid provided to the top or side portion of the recording apparatus 21. In this instance, the transfer sheet roll 103 that needs replacement is moved to a predetermined replacement position corresponding to the lid by rotating the rotary rack 99. Meanwhile, the image-receiving sheet roll 85 is also replaced by opening the lid.

A guide plate 123, on which the recording medium 5 (image-receiving sheet 87 or the transfer sheet 105) sent from the recording medium supply portion 31 is placed, is provided between the guides 95 and 119 of the recording medium supply portion 31 and the recording portion 39. The guide plate 123 is retractable as being moved up or folded so as not to interfere with the movement of the stage 27.

A sucking disc column 125, which is a plurality of sucking discs lined in the width direction of the recording medium (a direction perpendicular to the sheet surface of FIG. 3), is provided above the guide plate 123. The sucking disc column 125 is coupled to an air pipe placed inside the shielding frame 41 and extending from an unillustrated suction source, and is supported movably in an elevating direction and in a direction parallel to the stage moving surface by a supporting arm or the like. The sucking disc column 125 moves down from above the guide plate 123, and sucks the end portion of the image-receiving sheet 87 placed on the guide plate 123 by pressing the end portion against the guide plate 123. The sucking disc column 125 holding the end portion of the image-receiving sheet 87 through suction moves to the end portion (starting end side) of the stage 27 on the opposite side of the recording medium supply portion 31, and thereby pulls out the image-receiving sheet 87. The image-receiving sheet 87 is thus superposed on the top surface of the member to be recorded 23 held on the stage 27. It is preferable that the width (length in the X-direction) of the image-receiving sheet 87 is equal or nearly equal to the width of the member to be recorded 23.

Peel-off grooves 127 (see FIG. 6) forming the peel-off means of the recording medium are formed on the rim of a concave portion 71 of the stage 27. The peel-off grooves 127 are open at the side surface of the stage 27, so that peel-off claws described below can be inserted therein. The end portion of the image-receiving sheet 87 pulled out by the sucking disc column 125 is spread across the stage 27 so as to cover the peel-off grooves 127.

A pressure roller (squeeze roller) 129 is provided above the stage 27 of the recording portion 39, and the squeeze roller 129 is supported movably in the elevating direction and in the Y-direction.

As shown in FIG. 3, the squeeze roller 129 moves downward with respect to the image-receiving sheet 87 held by the sucking disc column 125 that has been moved to the starting end side, and presses against the end portion of the image-receiving sheet 87, after which it rolls toward the recording medium supply portion 31 while pressing the image-receiving sheet 87. The squeeze roller 129 thereby operates so as to smooth down creases of the image-receiving sheet 87 by squeezing the image-receiving sheet 87 against the member to be recorded 23.

The recording portion 39 may include an auxiliary heat roller besides the squeeze roller 129. The heat roller rolls over the image-receiving sheet 87 that has been squeezed by the squeeze roller 129 while pressing the image-receiving sheet 87 with heating. When such a heat roller is included, it is possible to bring the image-receiving sheet 87 into close adhesion to the member to be recorded 23 with a higher adhesion force than in a case where the image-receiving sheet 87 is brought into close adhesion to the member to be recorded 23 through the use of the squeeze roller 129 alone, thereby making it possible to improve a peel strength. Alternatively, the squeeze roller 129 may be a heat roller.

An image-receiving layer 87c is formed on the recording surface 25 of the member to be recorded 23 by peeling off the image-receiving sheet 87 brought into close adhesion to the member to be recorded 23.

The recording apparatus 21 described above normally records an image pattern on the recording surface 25 of the member to be recorded 23 according to the procedure detailed in FIG. 4.

Initially, the recording head 29 is retracted to the stand-by position 65, and Step 1 is performed.

In Step 1, the member-to-be-recorded supply portion 33 supplies the recording portion 39 with a member to be recorded 23 through the carry-in mechanism 49 so as to be fixed to the concave portion 71 of the stage 27 through suction.

Then, in Step 2, the image-receiving sheet 87 is supplied from the recording medium supply portion 31 and superposed on the member to be recorded 23 on the stage 27, so that the image-receiving sheet 87 is deposited thereon.

As shown in FIG. 3, the image-receiving sheet 87 is brought into close adhesion to the member to be recorded 23 by the squeeze roller 129.

Then, the image-receiving sheet 87 may be subjected to heat contact-bonding (that is, laminated) through the use of a heat roller in Step 3.

Then, in Step 4, the supporting layer 87a of the image-receiving sheet 87 is peeled off from the member to be recorded 23, and the image-receiving layer 87c is thereby transferred onto the surface of the member to be recorded 23. The supporting layer 87a of the image-receiving sheet 87 from which the image-receiving layer 87c has been transferred is carried out from the recording portion 39 by the sucking disc column 125, and discarded into the trash box 37 shown in FIG. 1.

Then, in Step 5, the transfer sheet supply portion 83 of the recording medium supply portion 31 supplies the transfer sheet 105 on the stage 27. The transfer sheet 105 cut into a predetermined length is brought into close adhesion to the member to be recorded 23 by the squeeze roller 129. As with the image-receiving sheet 87, the transfer sheet 105 may be then subjected to heat contact-bonding (that is, laminated) through the use of the heat roller in Step 6.

Then, the recording head 29 is returned to the recording original point position 69, and in Step 7, a writing laser beam Lb is emitted from the recording head 29 onto the transfer sheet 105 based on image data provided in advance. Hence, image exposure is performed with the writing laser beam Lb while the stage 27 is moved in sync with the image exposure.

Figure 9:
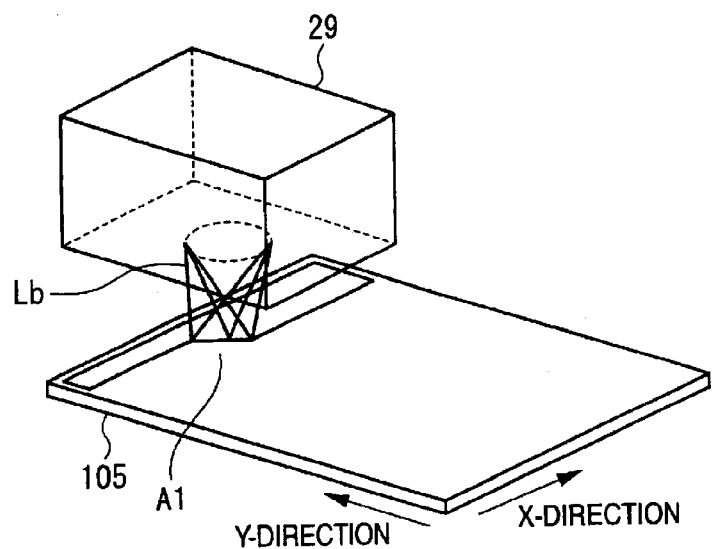
FIG. 9 is a perspective view showing a writing state with a writing laser beam emitted from a recording head through a recording method and by the recording apparatus according to the invention.

In other words, as shown in FIG. 9, predetermined spots of the writing laser beam Lb scan the rear of the transfer sheet 105 imagewisely (supporting layer 105a side).

The given image data is color-separated into images of the respective colors, and laser exposure is performed based on image data for the respective color-separated colors. The toner layer 105c of the transfer sheet 105 is thereby transferred onto the image-receiving layer 87c of the member to be recorded 23, and for example, an image in black (K) is formed on the member to be recorded 23.

At this point, the transfer sheet 105 is peeled off from the member to be recorded 23 and discarded in the case of recording a normal image pattern. However, in order to use resources effectively by reusing a non-recorded portion of the transfer sheet 105 left unused in the earlier recording processing, temporary storing means described below is provided.

As shown in Step 9 through Step 20, image formation is performed for the transfer sheets 105 of the respective colors in the same manner as forming the image in black (K). A full-color image can be thus obtained.

The member to be recorded 23 may be one of two substrates that together form a liquid crystal panel, and the image pattern to be transferred through the laser recording method described above may be recorded as an image pattern of spacers placed between the substrates. In this case, it is sufficient to use the transfer sheet 105 of one color.

The recording portion 39 of this embodiment includes the peel-off claws 131 and the peel-off roller 140 in addition to the aforementioned peel-off grooves 127 and the sucking disc column 125 as the recording medium peel-off means for peeling off the image-receiving sheet 87 and the transfer sheet 105 laminated onto the surface of the member to be recorded 23.

Figure 5:
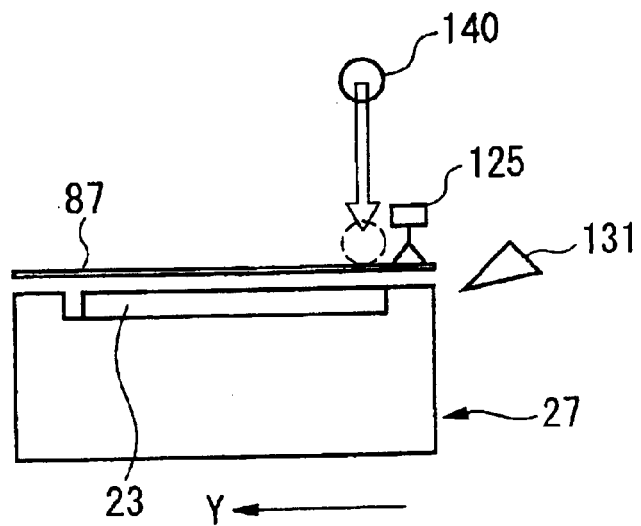
FIG. 5 is a view depicting an arrangement of a major portion in close proximity to the recording portion and used to explain a peel-off operation of the image-receiving sheet.
Figure 6:
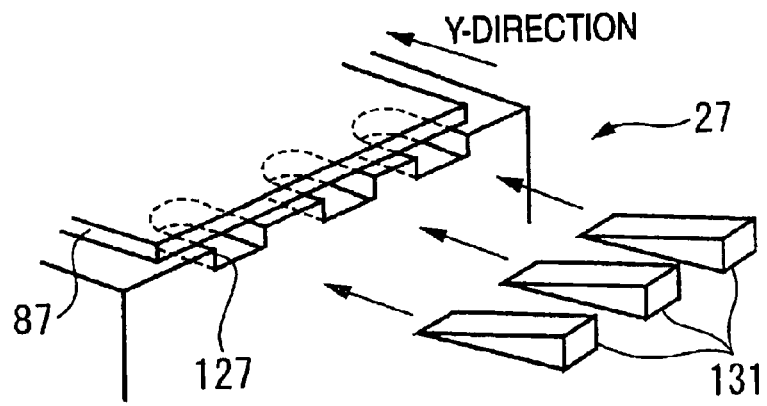
FIG. 6 is an enlarged perspective view of the rim of a concave portion of a stage provided with peel-off grooves.

As shown in FIG. 5 and FIG. 6, the peel-off claws 131 are provided at the start end side of the stage 27, so that they can enter the peel-off grooves 127 provided on the top surface of the stage 27 as described above, and they are moved to a retracted position when not in use so as to avoid interference with the stage 27 or the like.

The peel-off roller 140 is provided movably in the elevating direction and in the Y-direction and rotatablly as with the squeeze roller 129. Also, a suction hole used to vacuum suck the image-receiving sheet 87 and the transfer sheet 105 is provided on the peripheral surface of the peel-off roller 140.

A procedure when the transfer sheet 105, from which the image pattern has been transferred, is peeled off from the image-receiving sheet 87 will now be explained.

Figure 8A:
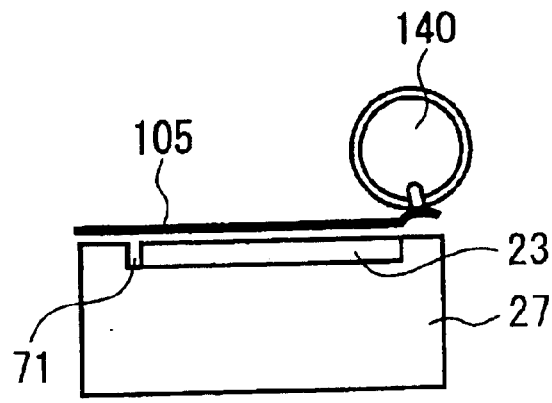
FIGS. 8A to 8D are explanatory views detailing a procedure of operations of the peel-off roller in the recording apparatus shown in FIG. 3 when the recording medium is peeled off.

When the transfer sheet 105 is peeled off, as shown in FIG. 5 and FIG. 8A, the peel-off roller 140 is first moved down to close proximity to the upstream side of the peel-off direction (the start end side of the stage 27), so that the peel-off roller 140 presses the vicinity of the end portion of the transfer sheet 105.

Figure 8B:
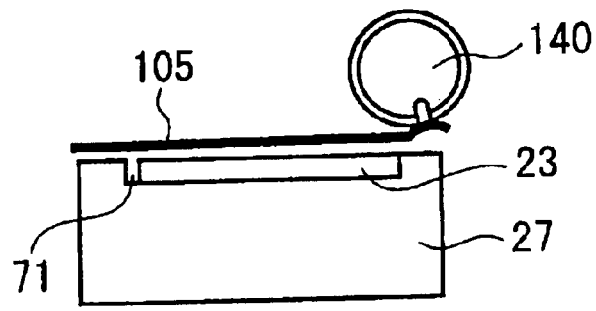

Then, the sucking disc column 125 is moved up slightly, and as shown in FIG. 6, the pee-off claws 131 are allowed to enter the peel-off grooves 127. Then, the peel-off claws 131 are moved up slightly (up to the position where no interference is caused with the stage 27 and the member to be recorded 23), and allowed to move in a direction (toward the left side of FIG. 5) to come in close proximity to the peel-off roller 140. The transfer sheet 105 is thus held by the peel-off roller 140 at one end through suction as shown in FIG. 8B.

Figure 8C:
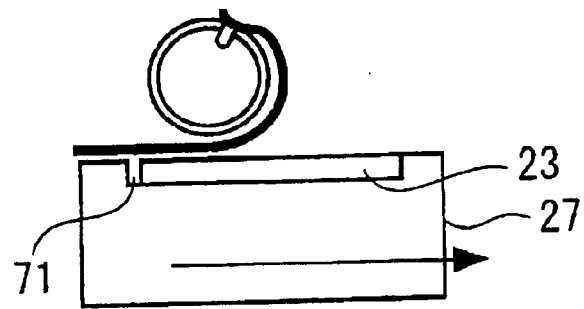

Then, as shown in FIG. 7 and FIG. 8C, by moving the stage 27 relatively with respect to the peel-off roller 140 in a direction (in the −Y-direction) to move away from the peel-off roller 140, a peel-off force is applied to the pressing portion of the peel-off roller 140, and the pressing portion is further moved from one end portion to the other end portion of the member to be recorded 23, which makes it possible to peel off the transfer sheet 105 from the entire recording surface 25.

When the transfer sheet 105 is peeled off by relatively moving the stage 27 (in the −Y-direction), the transfer sheet 105 is rotated by an unillustrated motor or the like, so that it is held by the peel-off roller 140 through suction and is gradually wound around the outer circumferential surface of the peel-off roller 140.

Figure 8D:
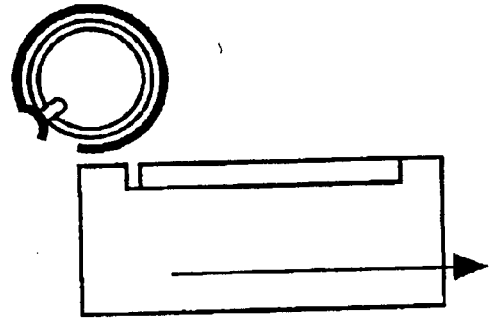

In a case where a non-recorded portion of the transfer sheet 105 is reused, the peel-off roller 140, around which the transfer sheet 105 has been wound as shown in FIG. 8D, is retracted to a position where it causes any trouble for operations of the squeeze roller 129 and the sucking disc column 125, and temporary stores the peeled transfer sheet 105 until the transfer sheet 105 is used again. In short, the peel-off roller 140 serves also as temporary storing means for the transfer sheet 105. When the transfer sheet 105 is reused, the stage 27 is moved relatively (in the +Y-direction) by following a reverse series of the processes described above, so that the peel-off roller 140 releases the transfer sheet 105 to be placed on the image-receiving sheet 87 again. Then, the squeeze roller 129 starts to roll again and brings the transfer sheet 105 into close adhesion to the image-receiving sheet 87.

In the case of the image-receiving sheet 87, the image-receiving layer 87c is transferred onto the recording surface 25 of the member to be recorded 23 as the supporting layer 87a is peeled off from the member to be recorded 23, and the supporting layer 87a alone is left. The used supporting layer 87a is held by the sucking disc column 125 through suction, and discarded into the trash box 37 after the sucking disc column 125 moves toward the right side (in the −Y-direction) of FIG. 7 and passes through the passing opening portion provided to the shielding frame 41.

Figure 13:
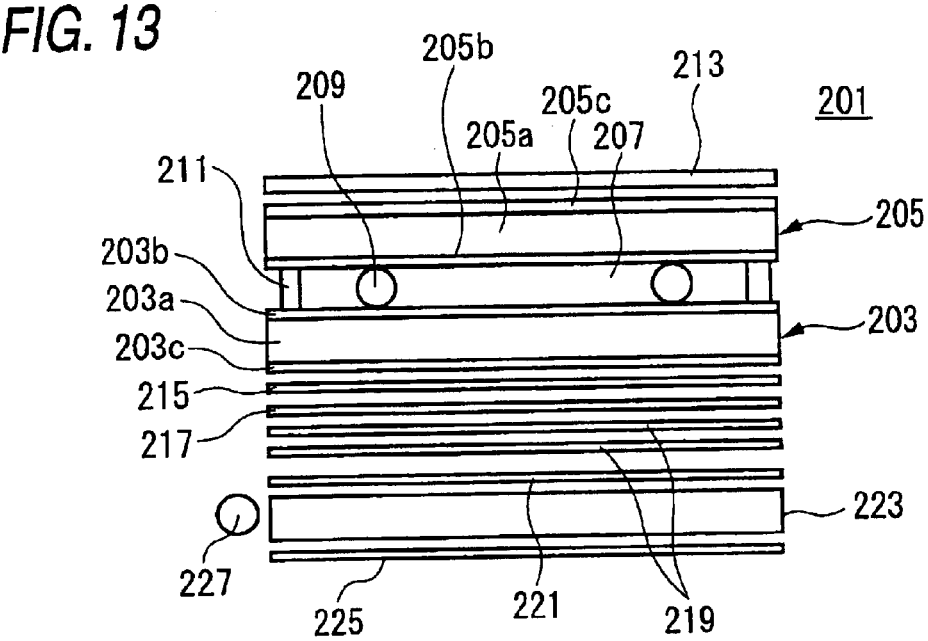
FIG. 13 is a cross section showing a structure of a liquid crystal panel.
Figure 14A:
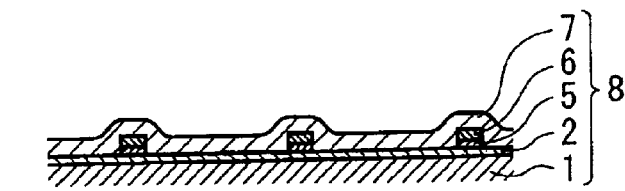
FIGS. 14A to 14C are explanatory views of a conventional method of forming spacers for use in the liquid crystal panel.
Figure 14B:
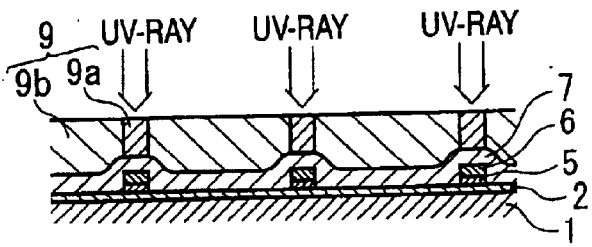
Figure 14C:
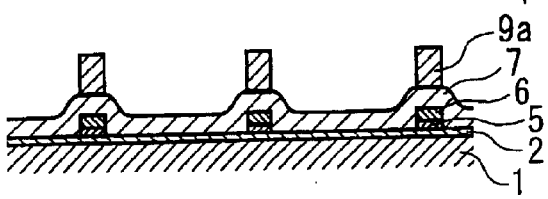
Figure 15:
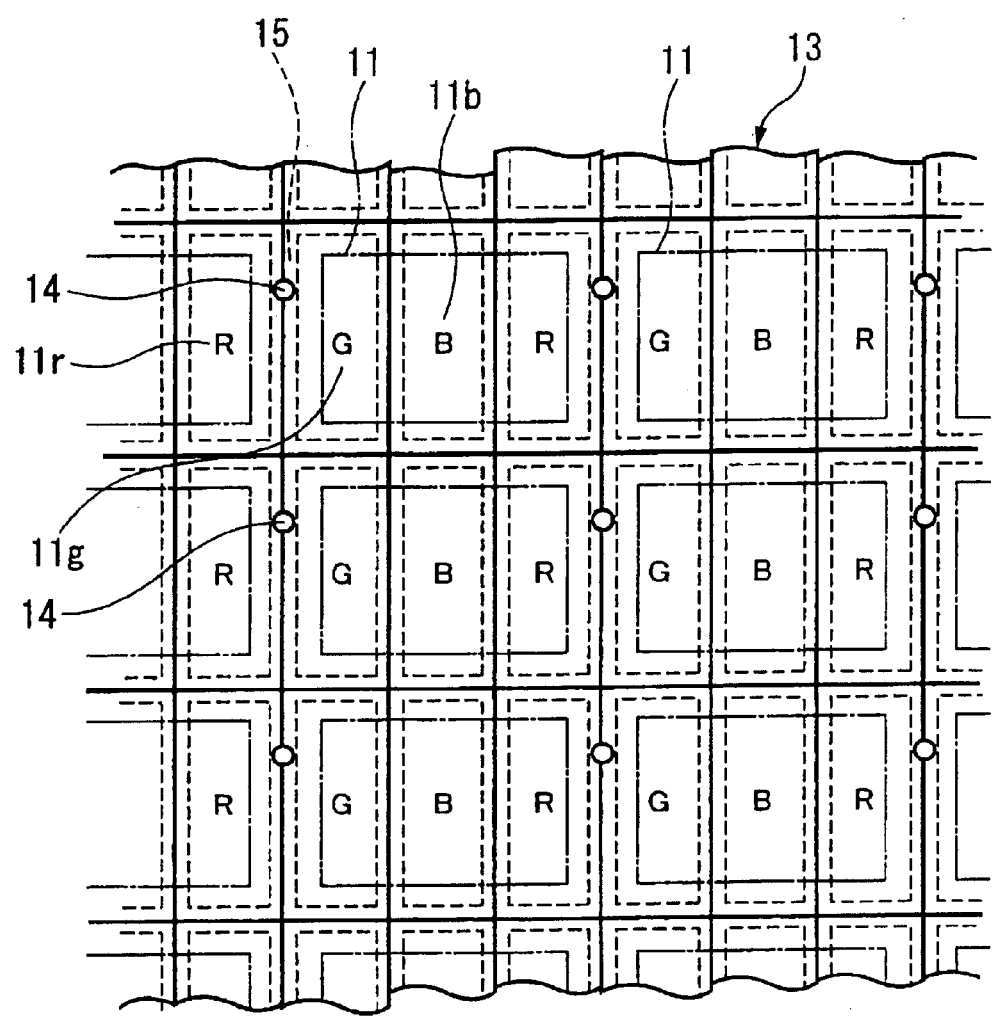
FIG. 15 is a view showing the placement of spacers on the surface of the substrate used to form the liquid crystal panel.

The following description will describe a procedure when the recording apparatus 21 is used to form spacers 14 on a narrow region 15 between pixels 11 for the sets of RGB pixel electrodes 11r, 11g, and 11b on a one-to-one basis as shown in FIG. 15 by attaching a lower substrate 203 (see FIG. 13) used to form the liquid crystal panel onto the stage 27 as the member to be recorded 23.

Initially, as shown in FIG. 3, the lower substrate 203 is set in the concave portion 71 of the stage 27 with the circuit layer 203b (see FIG. 13) of the lower substrate 203 that includes an array of the pixel electrodes being faced upward, and then Step 1 through Step 4 shown in FIG. 4 are performed.

The image-receiving layer 87c of the image-receiving sheet 87 is thereby transferred and deposited on the surface of the lower substrate 203.

After the image-receiving layer 87c is transferred, the supporting layer 87a of the image-receiving sheet 87 is peeled off from the lower substrate 203, and is then discarded into the trash box 37 as the sucking disc column 125 is moved while holding the supporting layer 87a through suction.

Then, the transfer sheet 105 is superposed on the image-receiving layer 87c transferred onto the lower substrate 203, and Step 5 through Step 7 shown in FIG. 4 are performed. Hence, by exposing an image pattern of spacers (an image corresponding to the spacers 14 shown in FIG. 15) through the use of a writing laser beam Lb emitted from the recording head 29, a recorded portion formed in the image forming layer 105c of the transfer sheet 105 is transferred onto the image-receiving layer 87c.

Then, the transfer sheet 105 is peeled off from the lower substrate 203 by the peel-off means formed by the peel-off claws 131 and the peel-off roller 140. The image pattern of spacers thus transferred is subjected to curing as needed and used as spacers.

The transfer sheet 105 held by the peel-off roller 140 is attached to the surface of the lower substrate 203 again in such a manner that a non-recorded portion (unexposed portion) left unused in the earlier recording processing will undergo recording processing of the same image pattern of spacers used last, so that the transfer sheet 105 is used repetitively until the non-recorded portion (unexposed portion) left thereon is consumed to a specified level or below.

Figure 10A:
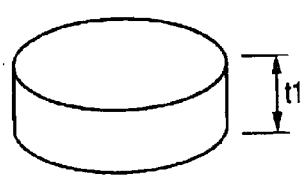
FIGS. 10A and 10B are perspective views of a spacer formed by the recording apparatus shown in FIG. 1.
Figure 10B:
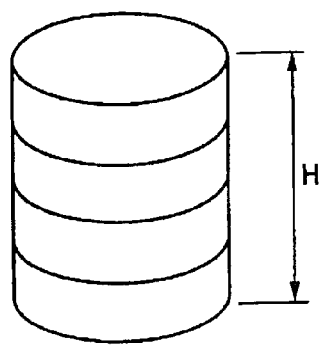

As shown in FIG. 10A, when a thickness t1 of the image forming layer (toner layer) 105c that is transferred in one exposure is less then a desired height for the spacer, the transfer processing from Step 5 through Step 8 of FIG. 4 is repeated with respect to the lower substrate 203 used last, and the desired height H is achieved eventually as shown in FIG. 10B. In this instance, the peel-off roller 140 that is temporary storing the transfer sheet 105 attaches the transfer sheet 105 again to the lower substrate 203 by shifting the position, so that the recorded portion (exposed portion) used in the earlier recording processing will not be positioned over the spacers already formed. Meanwhile, the recording head 29 and the stage 27 are positioned relatively with respect to each other, so that the image pattern to be transferred through new exposure will be positioned exactly over the image pattern transferred last. Then, the image pattern of spacers is exposed. In other words, the peel-off roller 140 in this case serves not only as the temporary storing means, but also as recording medium reattachment mechanism that returns the transfer sheet 105 to the image-receiving sheet 87 at a shifted position.

When the unexposed portion is consumed until it accounts for 50% or less, more preferably, 20% or less of the area of the transfer sheet 105 while the transferring is repeated, the transfer sheet 105 is discarded into the trash box 37.

The above description explains a case where the spacers are formed on the lower substrate 203 used to form the liquid crystal panel 201. It should be appreciated, however, that the spacers can be formed on the upper substrate 205 as well in the same manner.

It should be noted, however, that when the spacers are formed on the upper substrate 205 on which a color filter having a black stripe is placed, it is preferable to set the transfer position of the image pattern on the black stripe.

Also, it is preferable that the maximum diameter of the image pattern of spacers to be transferred onto the black stripe is set two or less times greater than the width of the black stripe. It is more preferable that the maximum diameter of the image pattern of spacers to be transferred onto the black stripe is set to be equal to or less than the width of the black stripe.

The method of forming a spacer for use in a liquid crystal panel of this embodiment is a method of transferring the image pattern of spacers, which is recorded in the transfer sheet 105 through recording processing using laser beam irradiation, onto a substrate on which the transfer sheet 105 is deposited, and makes it possible to form spacers, for example, in a narrow space between pixels as described above, at high accuracy that can be achieved through the use of an image recording technique.

Hence, because a load can be well dispersed by forming a number of spacers exactly at their respective predetermined positions, concentration of a load on the spacers can be reduced. It is thus possible to prevent damages to the elements and the circuits on the substrate caused by an excess load.

Also, by limiting the forming position of the spacers to a portion where the presence of the spacers do not adversely effect the display performance, for example, a portion on the black stripe between adjacent pixels forming the liquid crystal panel, it is possible to prevent the occurrence of inconveniences, such as deterioration of contrast and deterioration of writing reproducibility.

Also, in a case where the spacers are formed on the substrate on which a color filter is provided, unlike the conventional method of using UV cure resin, there is no possibility that the alignment film is dissolved in a solvent contained in the resin layer, and it is thus possible to prevent dissolution of the alignment film.

In addition, because neither the coating process nor the drying process that takes a time is needed, the productivity can be increased.

Further, because an expensive mask is not used to transfer the image pattern of spacers, the manufacturing cost can be saved, which makes this method suitable to a large-scaled liquid crystal panel.

In regard to the transfer sheet 105, even in a case where an area of the image pattern of spacers to be transferred at a time is small, by shifting the recording position of the image pattern while the transferring is performed repetitively to the same transfer sheet 105, it is possible to prevent such an event that the transfer sheet 105 is discarded with a large quantity of the image forming layer 105c left as an unexposed portion. Hence, the materials used for spacers can be economized and a quantity of waste of the materials used or the like can be reduced, thereby making it possible to achieve environmental protection through effective utilization of resources and a reduction of waste.

Also, as shown in FIG. 10B, by repetitively transferring the same image pattern onto the same point on the substrate, the height of the spacers to be formed can be readily changed and adjusted.

Figure 11:
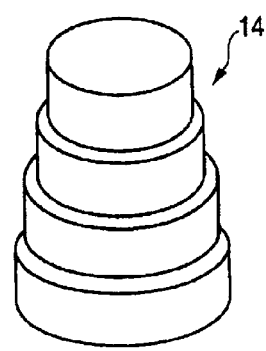
FIG. 11 is a perspective view showing another example of a spacer formed by the recording apparatus shown in FIG. 1.

In addition, in a case where the transferring is repeated on the same point on the substrate, by gradually shrinking the diameter of the image pattern to be transferred each time the transferring is performed, the spacer 14 can be formed in a structure that is reduced stepwise toward the tip end as shown in FIG. 11. When formed in such a structure, a contact area between the tip end of the spacer 14 and the opposing substrate can be reduced, and in the event that the spacer 14 is transferred and formed at a slightly shifted position, the tip end will not go outside of the position where it is supposed to come into contact with the opposing substrate. This makes it possible to ensure a spacing between the substrates in a more secure manner.

The concrete arrangement of the apparatus for forming the spacers 14 is the same as that of an existing recording apparatus that forms an image, such as a color filter, on the substrate used to form the liquid crystal panel. Hence, by using the existing recording apparatus, the manufacturing cost can be reduced by minimizing the need for extra special facility on one hand, and improving the operating rate of the existing facility on the other hand.

Figure 12:
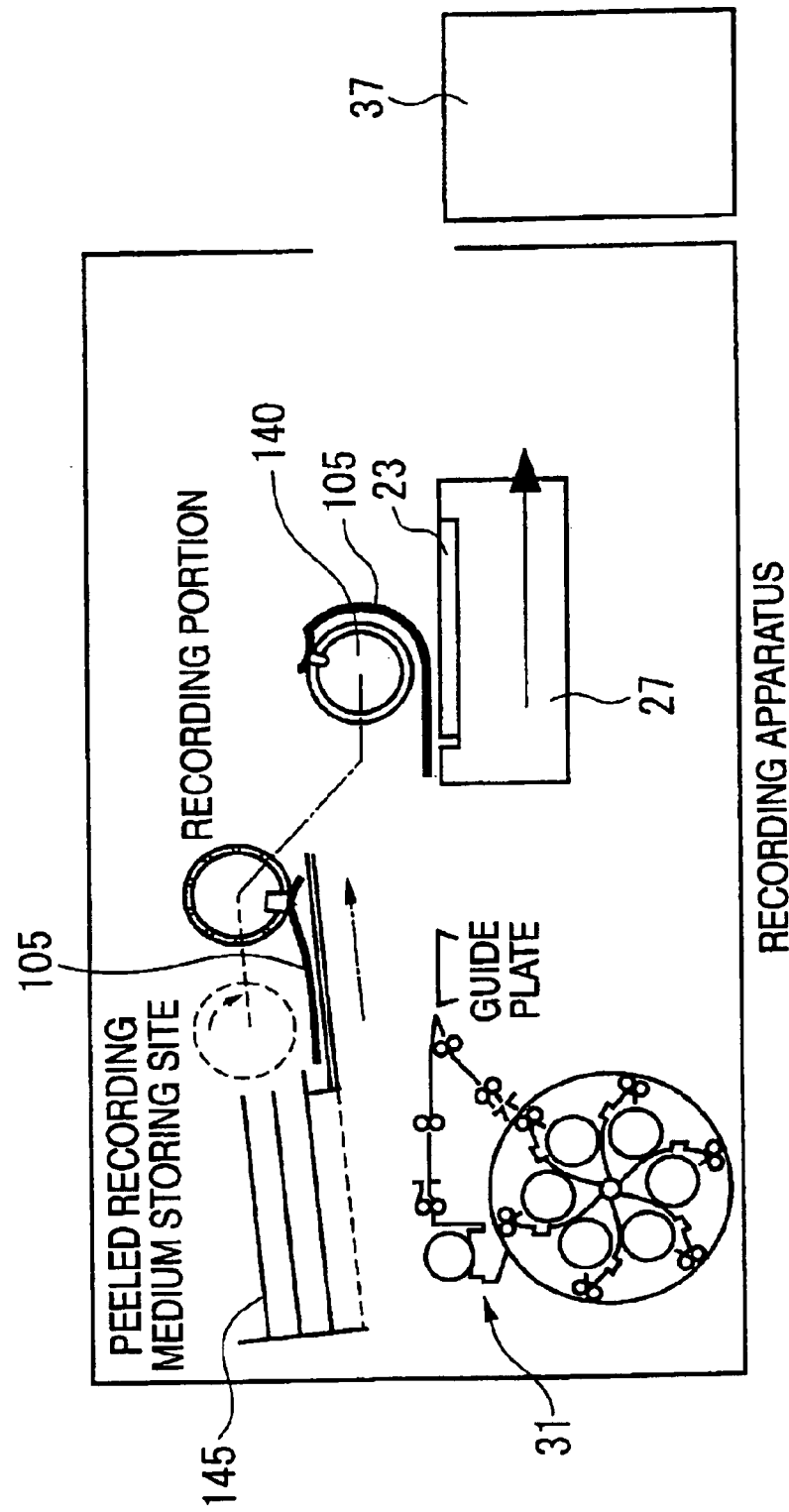
FIG. 12 is a longitudinal cross section showing another embodiment of the recording apparatus according to the invention that is used to form spacers.

In this embodiment, the peel-off roller 140 itself sucks and holds the transfer sheet 105 that is peeled off from the substrate on the stage 27 to be reused. However, as shown in FIG. 12, it may be arranged in such a manner that another temporary storing means 145 for temporarily storing the transfer sheet 105 is provided to the existing recording apparatus 21 in addition to the peel-off roller 140, so that the peel-off roller 140 moves to the temporary storing means 145 and releases the transfer sheet 105 it holds above the temporary storing means 145.

When arranged in this manner, for example, by forming the temporary storing means 145 with a capability of accommodating plural kinds of transfer sheets 105 separately, plural kinds of transfer sheets 105 can be used selectively when the spacers are formed, which makes the recording apparatus 21 more convenient.

A laser beam used when recording an image is not limited to those having a specific wavelength. For example, a laser beam of various wavelengths can be used depending on the properties of a recording medium to be used. Above all, in a case where the existing recording apparatus 21 is used and the recording apparatus 21 is of the type that records an image of a color filter, while wavelengths for a recoding medium used to form a color filter and a recording medium used to form a spacer are different, the recording apparatus 21 will find a wider range of applications when the recording head is arranged in such a manner that it can switch output recording wavelengths correspondingly to the respective recording media.

Alternatively, it is possible to use an existing recording apparatus by providing two recording heads that output different wavelengths respectively for the recording medium 5 used to form a color filter and the recording medium used to form a spacer each having a different recording wavelength.

This embodiment is arranged in such a manner that a transfer sheet having both a light-to-heat converting layer and an image forming layer (toner layer) is used as a recording medium, and an image is recorded through exposure with a laser beam used as the recording head. However, a thermal head may be provided as the recording head, so that image is recorded through the use of the thermal head.

In short, a recording medium and a recording head equipped to the recording portion of the apparatus that are used in the invention are not limited to those of the laser recording method described above.

Accordingly, besides a heat mode material having a light-to-heat converting layer, spacers can be formed by using a recording medium made of a photon mode material having no light-to-heat converting layer.

Lasers used for the heat mode material include, for example, a semiconductor laser (800 to 1100 nm), a YAG laser (1064 nm), a YLF laser (1047 nm), an optical fiber laser (1100 nm), a He—Xe laser (1150, 1520, 3390, 3570 nm), a He—Ne laser (1523 nm), an Er laser (1500 nm), and a carbon dioxide gas laser (10600 nm). Lasers used for the photon mode material include, for example, an excimer laser (193, 248 nm), a YAG+SHG laser (266, 355 nm), a semiconductor laser (405, 630, 655, 670, 780 nm), a $N_2$ laser (337 nm), a fluorine laser (157 nm), a dye+SHG laser (189 to 518 nm), a He—Ne laser (545, 594, 612, 633 nm), a He—Cd laser (325, 442 nm), an Ar laser (458, 476, 488, 515 nm), a YAG+SHG laser (532 nm), and a sapphire laser and a dye laser (330 to 1036 nm).

Further, when a recording medium made of a photon mode material is used, a spontaneous emission type LED may be used for exposure instead of a laser beam.

In the spacer forming apparatus of the invention, the supporting member of the substrate used to form the liquid crystal panel is not limited to the stage 27 that supports the substrate on the plane as described above. For example, in a case where the substrate used to form the liquid crystal panel is made of a flexible film or the like, a recording apparatus equipped with a drum as the supporting member of the substrate used to form the liquid crystal panel may be used.

Also, in this embodiment, the recording medium 5 is composed of the image-receiving sheet 87 and the transfer sheet 105 deposited on the image-receiving sheet 87. However, the image-receiving sheet 87 is not necessarily provided, and it may be arranged in such a manner that the transfer sheet 105 is superposed on a substrate 23 used as a member to be recorded, so that an image pattern is transferred onto the substrate 23.

Also, in this embodiment, the peel-off roller 140 is provided for exclusive use to peel-off the transfer sheet 105. However, in a case where the squeeze roller 129 is not needed when attaching the image-receiving sheet 87, the squeeze roller 129 may be used also as the peel-off roller.

As has been described above, the method of forming a spacer for use in a liquid crystal panel of the invention is a method, in which an image pattern recorded through recording processing by the recording head is used as a spacer, and it enables high-precision processing, for example, in a narrow portion between pixels, at high accuracy that can be achieved through the use of an image recording technique. Hence, a number of spacers can be formed between pixels and a load acting on the substrates can be dispersed to the spacers. This reduces concentration of a load on the spacers, and thereby making it possible to prevent damages to the elements and the circuits on the substrate caused by an excess load.

Also, because the spacers can be formed by limiting their forming position to a portion where the presence of the spacers do not adversely effect the display performance, for example, a portion between pixels or on the black stripe, it is possible to prevent the occurrence of inconveniences, such as deterioration of contrast and deterioration of writing reproducibility.

In addition, because neither the coating process nor the drying process that takes a time is needed, the productivity can be increased.

Further, because an expensive mask is not used to transfer the image pattern of spacers, the manufacturing cost can be saved, which makes the method suitable to a large-scaled liquid crystal panel.

Because the transfer sheet is used repetitively until a non-recorded portion of the image forming layer is consumed to a specified level or below, the materials used for spacers can be economized and a quantity of waste of the materials used or the like can reduced, thereby making it possible to achieve environmental protection through effective utilization of resources and a reduction of waste.

Also, because the spacer is formed through image recording, by performing multiple recording to obtain a spacer of a laminated structure, a height can be readily changed.

Also, the apparatus for forming spacers for use in a liquid crystal panel of the invention is the same, for example, as an existing recording apparatus that forms an image, such as a color filter, on the substrate. Hence, by using the existing recording apparatus, the manufacturing cost can be reduced by minimizing the need for extra special facility on one hand, and improving the operating rate of the existing facility on the other hand.

What is claimed is:

1. A method of forming a spacer for a liquid crystal panel, said spacer being disposed between two substrates that together form the liquid crystal panel to secure a spacing between said substrates, comprising steps of:

superposing a transfer sheet on a surface of one of said two substrates;

recording a desired image pattern onto said transfer sheet by image recording process through the use of one of a laser beam and heat; and peeling off said transfer sheet to form said image pattern transferred onto said substrate.

2. The method of forming a spacer according to claim 1, wherein, in a case where a color filter having a black stripe is placed on said substrate on which said image pattern is to be formed, a transfer position of said image pattern is set on said black stripe.

3. The method of forming a spacer according to claim 2, wherein a maximum width of said image pattern to be transferred onto said black stripe is set two or less times greater than a width of said black stripe.

4. The method of forming a spacer according to claim 1, wherein said transfer sheet is reused until a remaining non-recorded portion, where said image pattern is not recorded, reaches a specified level or below by repetitively performing steps of:

superposing said transfer sheet on said substrate at a position shifted from a position exposed last, so that the non-recorded portion undergoes the image recording process next;

performing the image recording process; and peeling off said transfer sheet from said substrate side.

5. The method of forming a spacer according to claim 1, wherein said image pattern is repetitively transferred onto a same point on said substrate used to form the liquid crystal panel, so that a spacer of a desired height is formed.

6. The method of forming a spacer according to claim 5, wherein said image pattern to be transferred is reduced gradually in size each time transferring is performed when said spacer of the desired height is formed.

7. An apparatus for forming a spacer for use in a liquid crystal panel, said spacer being disposed between two substrates that together form the liquid crystal panel to secure a spacing between said substrates, comprising:

a stage for supporting at least one of said two substrates;

a recording medium supply portion for supplying a recording medium onto said substrate placed on said stage;

a recording head for forming a desired image pattern onto said recording medium placed in piles through the use of one of a laser beam and heat;

recording medium peel-off means for peeling off said recording medium from said substrate; and recording medium reattachment means for returning said recording medium onto said substrate by shifting a position of said recording medium to set a non-recorded portion remaining on said recording medium peeled off by said recording medium peel-off means as a next recoding portion of said image pattern.

8. The apparatus for forming a spacer according to claim 7, further comprising:

temporary storing means for temporarily storing said recording medium peeled off by said recording medium peel-off means.

9. The apparatus for forming a spacer according to claim 7, wherein said recording head switches wavelength of laser beam from which is output in associated with a recoding medium used to form a color filter and a recording medium used to form a spacer each having a different recording wavelength.

10. The apparatus for forming a spacer according to claim 7, wherein said recording head has first recording head that outputs first laser beam in associated with a recoding medium used to form a color filter and a second recording head that outputs second laser beam in associated with a recording medium used to form a spacer, wavelengths of the first laser beam and the second laser beam are respectively different.

* * * * *